(No Model.)

B. A. LONG.
HORSE TRAINING BLIND.

No. 449,485. Patented Mar. 31, 1891.

WITNESSES:
Fred G. Dieterich
P. B. Turpin.

INVENTOR:
Brewster A. Long.
BY Munn & Co
ATTORNEYS

UNITED STATES PATENT OFFICE.

BREWSTER A. LONG, OF TROY, PENNSYLVANIA.

HORSE-TRAINING BLIND.

SPECIFICATION forming part of Letters Patent No. 449,485, dated March 31, 1891.

Application filed October 4, 1890. Serial No. 367,132. (No model.)

*To all whom it may concern:*

Be it known that I, BREWSTER A. LONG, residing at Troy, in the county of Bradford and State of Pennsylvania, have invented an Improvement in Horse-Training Blinds, of which the following is a specification.

My invention is an improvement in devices for training horses, and has for an object to provide a blind for use in training horses to trot, so as to give the horse a proper knee action, cause him to reach long, and to prevent his interfering in front and to avoid forging, which ends I effect by forming the blind so that it will shut out all view forward and to the side and will at the same time leave the horse's eyes exposed to the air and light and so that the horse's view to the rear is not obstructed.

The invention consists in certain novel constructions and combinations of parts, as will be hereinafter described, and pointed out in the claims.

Figure 1:
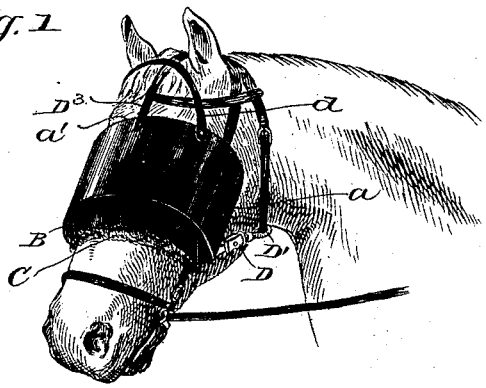
Figure 2:
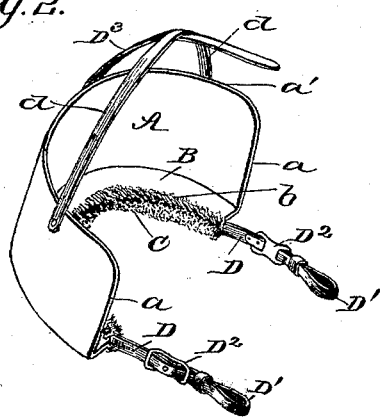
Figure 3:
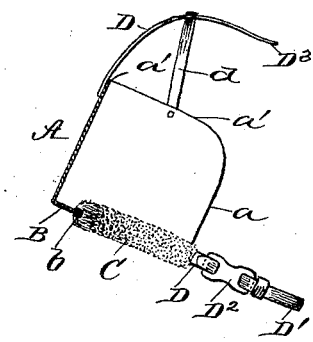
Figure 4:
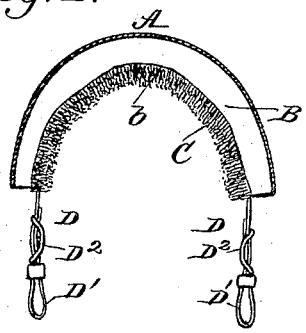

In the drawings, Figure 1 is a view showing my improved blind in position for use. Fig. 2 is a detail perspective view of the blind. Fig. 3 is a longitudinal or vertical section, and Fig. 4 is a transverse section, of the blind.

I have discovered that blind horses will develop a high knee action, resulting, doubtless, from a desire to step clearly over any possible obstruction, and I have also discovered that this development of high action results in an increase of speed. I have further discovered that by shutting out the view of horses to the front and both sides I secure effects similar to those experienced in blind horses. Consequently in carrying out my invention I have sought to provide a blind which can be easily applied or removed and which will shut out the view from the front, both sides, and below, and yet will be open at the top, so that the eyes will be exposed to the air and light and to the rear, so that the horse's view to the rear will not be obstructed.

In the construction shown the blind is formed with a main blind-piece A, which in practice is formed longitudinally straight, so that it will lie from side to side approximately parallel to the horse's head, and curved or bent laterally or transversely to conform to the head of the horse, the piece A being rectangular and its upper corners being formed so that in practice they will extend above and rearwardly past the eyes of the horse and effectually exclude the view to either side. In thus forming the piece A it is found convenient and desirable to make it with its side edges $a$ at approximately right angles to the top edges $a'$, as clearly shown in the drawings. By preference the piece A is provided at its lower end with the supporting or flange piece B, which projects inwardly and has its edge $b$ conformed generally to the contour of a horse's face shortly below the eyes, about as shown in the drawings, Fig. 1. This flange piece or support might be formed integral with and crimped or bent inward from the lower edge of piece A; but it may be preferred to cut it separately from such piece and stitch or otherwise suitably secure it thereto, as shown. I find it convenient and preferable to make both pieces A and B of stout harness-leather; but manifestly the material may be varied. This flange portion B serves to shut out the view from below. As before stated, the edge $b$ of the flange portion B is conformed generally to the contour of the horse's head; but to relieve the harshness of the edge against the nose I prefer to provide a fibrous-like cushion C on said edge; but the cushioning function of this cushion C is by no means its only one, as such cushion renders the edge self-conforming to the face of the horse, fitting closely thereto and shutting out the view from below. It will be seen, therefore, that the cushion C serves an important purpose in addition to that of a cushion. By preference I make this cushion C of a strip of sheep-skin having a heavy fleece and apply it to the edge $b$, after the fashion of a binding-strip.

Straps are provided for holding the blind to the bridle. By preference I provide a strap D at each rear corner of the blind, preferably attaching them to the flange portion B, as shown. These straps are looped back upon themselves, forming loops D', and are secured by buckles D², so that the loops D' can be adjusted nearer to or farther from the blind to fit different sizes of horses.

In securing the blind to the ordinary bridle the throat-latch is passed through the loops D', thus serving to hold the lower end of the blind firmly and securely in place. At its upper end the blind is secured by a top strap D³, which extends up and buckles to the crown-strap of the bridle. Side trace-straps $d$ lead off from the strap D³ to the upper edge of piece A at each side and serve with the strap D³ to secure the upper end of the piece A properly in place. Thus it will be seen that the blind can be quickly and easily applied or removed.

In use with the blind it is found that the horse will quickly acquire a high knee action and a long reach. Such long reach necessitating a quick advance and return movement of the fore legs insures the movement of such legs forward and back on straight lines, thus avoiding any false movements, and the long reach and high action requiring the horse to pick his fore feet up quickly, thus avoiding forging or striking of his fore feet by his hind ones, the speed being increased, as will be readily understood.

It will be seen that the piece A is held slightly away from the horse's face all around, so that at its rear edges it stands out from the horse's head, permitting him to see rearwardly toward the driver, thus giving him confidence in the driver, as will be readily understood.

In addition to its use in training horses to the knee action the device will be found useful in handling bolting horses and balking horses, as it serves to shut out the view forward and sidewise without tying up the horse's eyes.

As the device is especially useful on young stock, it will be understood that it may be made in different sizes, some to fit small young stock and some to fit large and full-grown horses.

Having thus described my invention, what I claim, and desire to secure by Letters Patent, is—

1. In a training-blind, a main portion consisting of a straight longitudinal piece curved transversely, provided at its lower edge with a rearwardly-projected padded flange or supporting-piece having its rear edge conformed to the contour of the front side of the animal's head just below the eyes and arranged and adapted at such rear edge to bear snugly against the animal's head, and provided with devices by which it may be secured in place, all substantially as and for the purposes set forth.

2. A training-blind, substantially as described, having a main piece or portion provided at its lower edge with a rearwardly-projected flange or portion and having along the edge of such flange or portion a cushion of fibrous-like material, whereby to fit closely against the face of the animal, and devices by which to secure the blind in place, substantially as set forth.

3. The improved training-blind herein described, consisting of the main portion A, made straight longitudinally and bent or curved laterally, the flange piece or portion B projected rearwardly from the lower edge of the piece A and having its rear edge conformed generally to the contour of the horse's face shortly below the eyes, the fibrous-like cushion secured along the said rear edge, the straps C, having loops C', and the straps D, all substantially as and for the purposes set forth.

BREWSTER A. LONG.

Witnesses:
P. B. TURPIN,
EDWD. W. BYRN.